United States Patent
Baker et al.

(10) Patent No.: US 8,184,913 B2
(45) Date of Patent: May 22, 2012

(54) CLUSTERING VIDEOS BY LOCATION

(75) Inventors: Simon J. Baker, Medina, WA (US); Charles Lawrence Zitnick, III, Seattle, WA (US); Gerhard Florian Schroff, Oxford (GB)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 12/416,152

(22) Filed: Apr. 1, 2009

(65) Prior Publication Data

US 2010/0254614 A1 Oct. 7, 2010

(51) Int. Cl.
*G06K 9/68* (2006.01)
(52) U.S. Cl. .......................................... 382/218
(58) Field of Classification Search .................. None
See application file for complete search history.

(56) References Cited

U.S. PATENT DOCUMENTS

| | | | |
|---|---|---|---|
| 2003/0086496 A1* | 5/2003 | Zhang et al. | 375/240.16 |
| 2003/0097186 A1 | 5/2003 | Gutta et al. | |
| 2003/0202709 A1 | 10/2003 | Simard et al. | |
| 2007/0009178 A1 | 1/2007 | Kim et al. | |

OTHER PUBLICATIONS

"International Search Report", Mailed Date: Oct. 14, 2010, Application No. PCT/US2010/029709, Filed Date: Apr. 1, 2010, pp. 10. (MS# 326103.02).

\* cited by examiner

*Primary Examiner* — Claire X Wang
(74) *Attorney, Agent, or Firm* — Gonzalez Saggio & Harlan LLP

(57) ABSTRACT

Described is a technology in which video shots are clustered based upon the location at which the shots were captured. A global energy function is optimized, including a first term that computes clusters so as to be reasonably dense and well connected, to match the possible shots that are captured at a location, e.g., based on similarity scores between pairs of shots. A second term is a temporal prior that encourages subsequent shots to be placed in the same cluster. The shots may be represented as nodes of a minimum spanning tree having edges with weights that are based on the similarity score between the shots represented by their respective nodes. Agglomerative clustering is performed by selecting pairs of available clusters, merging the pairs and keeping the pair with the lowest cost. Clusters are iteratively merged until a stopping criterion or criteria is met (e.g., only a single cluster remains).

15 Claims, 4 Drawing Sheets

CLUSTERING VIDEOS BY LOCATION

BACKGROUND

When viewing videos, such as to select certain desired segments, location can be a useful source of information for a variety of tasks. For example, a user may recall that a home video shot in a child's playroom contains a particular scene that the user wants to send to a relative, whereby it would be useful to quickly locate video segments (or representative images) of those videos taken in that location. In general, users may want to browse or search videos by location, annotate locations, and/or create location-specific compilations.

Location-based clustering algorithms attempt to assist users in such a task. However, one significant challenge for location-based clustering algorithms is the wide range of appearances that exist within a single location. For example, consider a video taken within the same room of a house. Depending on the viewpoint as to where each shot was captured, widely varying appearances are possible.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which shots representative of video frames are clustered based upon having similar locations, including by optimizing a global energy function using agglomerative clustering. Similarity scores between pairs of shots are computed, as well as a value indicative of temporal consistency between shots. The global energy function sums the similarity score data and temporal consistency data (weighted for relative contribution) for shots. In one implementation, the shots are represented by nodes of a minimum spanning tree having edges with weights that are based at least in part on the similarity score between the shots represented by their respective nodes.

Agglomerative clustering is performed by initializing clusters with one keyframe representative of a shot (or multiple keyframes taken from the same shot), and selecting pairs of clusters. Each pair is merged into a candidate cluster, keeping the merged candidate cluster with the lowest cost as a new cluster. Clusters are iteratively merged until a stopping criterion or criteria is met (e.g., only some number of clusters remain).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards clustering videos by location, including by optimizing a global energy function comprising a cluster cost (data term) and a temporal prior. In one aspect, clustering is optimized as described herein, which takes place after the representation of the shots and a distance measure between the shots has been decided.

While clustering by location as described herein performs well with "home" video, it is understood that this is only one type of video. Professionally captured video, such as shown on television or movies, may likewise benefit from the technology described herein, regardless of when and where clustering by location occurs (e.g., in a studio or in a viewer's personal collection). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and video processing in general.

Figure 1:
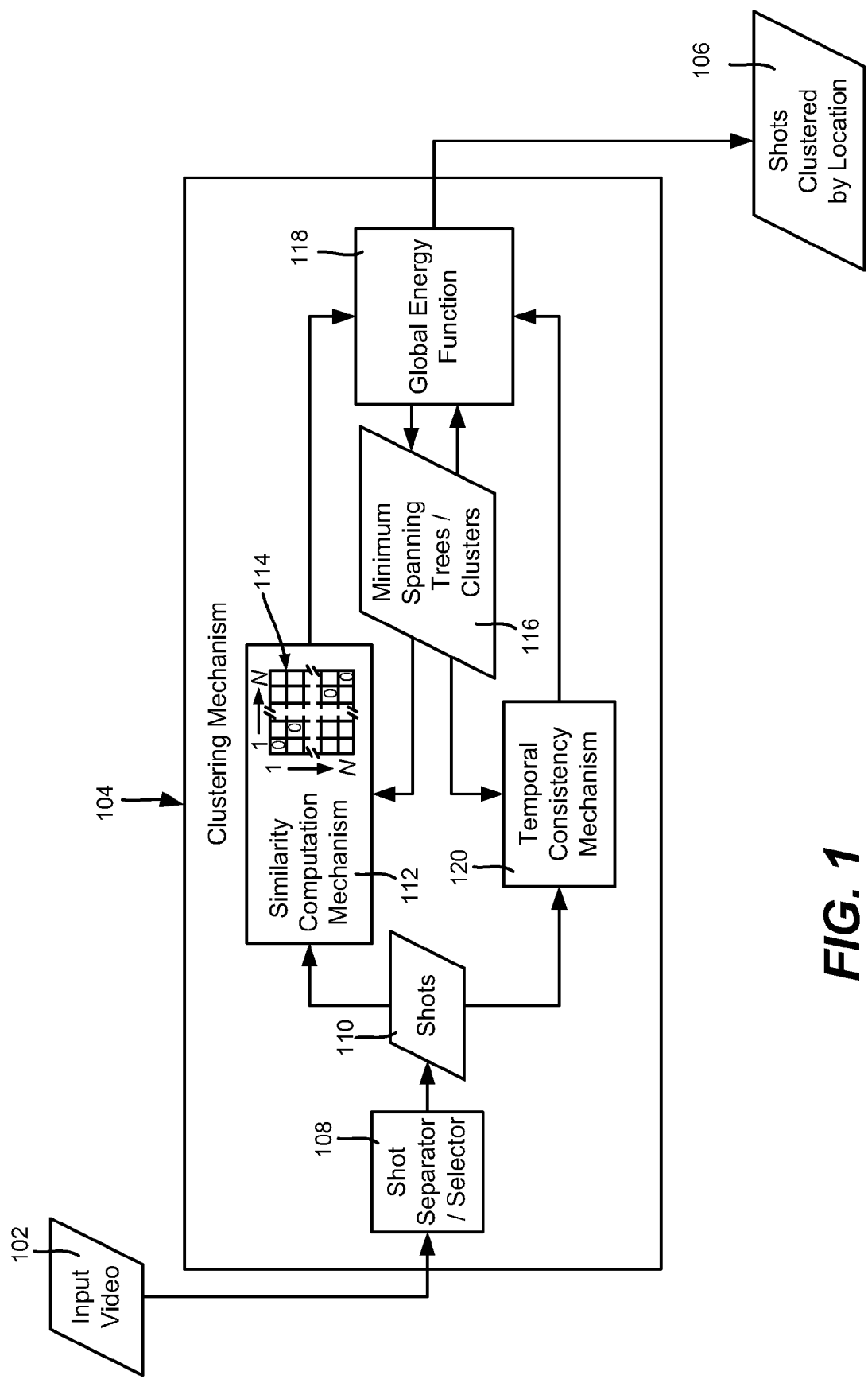
FIG. 1 is a block diagram showing example components for clustering videos based upon location.

FIG. 1 shows various aspects related to clustering videos by location. In general, input video 102 from any suitable source is processed by a clustering mechanism 104 into clusters of shots 106. To this end, a shot separator 108 separates the video 102 into shots 110, each shot comprising one or more frames. In general, shot boundaries are determined when the camera turns from off to on, or otherwise rapidly changes what is being captured, which may be accomplished by any suitable detection means including known technologies; for example, Microsoft® Movie Maker provides such functionality.

Once separated into the shots 110, a similarity score between each of the shots is then computed, as represented in FIG. 1 by the similarity computation mechanism 112. In one implementation, similarity between shots is determined by a pair-wise distance function, described below.

In one alternative, rather than compute a score for each frame in a series of frames comprising a shot, the center frame of a shot may be selected as a keyframe for the similarity comparison. As another alternative, some reduced number of frames of a shot may be selected as multiple keyframes by sampling at a fixed sampling rate, e.g., every tenth frame (possibly with the center frame used if less than some minimum number of frames). As described below, multiple keyframes of a single shot may be automatically clustered together. Note that it is feasible to compute a mosaic based upon the various frames, however zooms and movement (e.g., of people) present difficulties with this approach.

To establish numerical representations for the keyframes, which can then be compared for similarity, one implementation computes a histogram of textons for evaluation against a texton vocabulary, such as having 128 textons that is developed offline using randomly sampled 5×5 patches and k-means clustering. More particularly, for each keyframe in a shot, 5×5 patches are extracted in a dense grid. Each patch is then assigned to the closest texton, and by aggregating over the entire keyframe, a histogram over textons is produced. To compute the distance between a pair of texton histograms and thus determine similarity between frames, the known Chi- Squared distance computation may be used. Note that an alternative is to use Latent Dirichlet Allocation.

Note that alternative mechanisms may be used to determine similarity. For example, one alternative inter-keyframe distance function is feature-based. A set of affine invariant features are found using known techniques. A visual word is assigned to each image patch extracted by the features using a vocabulary tree (e.g., on the order of one million leaf nodes). The similarity score between images is found using well-known term frequency—inverse document frequency (TF-IDF) scoring concepts.

The similarity scores for N keyframes basically form a grid 114 of scores as represented in FIG. 1. As described below, from these scores, clusters are produced, arranged as a set of minimum spanning trees 116. In general, these minimum spanning trees 116 are processed by a global energy function 118 to obtain the clusters of shots 106.

In one implementation, the global energy function 118 comprises two terms, including a cluster cost (or data) term and a temporal prior term:

$$E_{Global} = E_{Cluster} + \lambda E_{Temporal} \quad (1)$$

where $E_{Cluster}$ is a model of the clusters (the data term), $E_{Temporal}$ is the temporal prior term, and $\lambda$ is a weight.

In the cluster model, the set of shots captured at the same location will likely have a characteristic structure. Some pairs of shots may have radically different viewpoints, while other pairs may be very similar; however overall, the cluster is intuitively expected to be reasonably dense and well connected. In general, these concepts are embedded into the cluster cost $E_{Cluster}$.

The clustering mechanism optimizes the global energy $E_{Global}$ in Equation (1) using known agglomerative clustering techniques. In general, agglomerative clustering initially assigns each shot to its own cluster; however, note that in the alternative that allows more than one keyframe per shot, the clustering algorithm is initialized so that frames of the same shot are initially part of the same cluster.

Once initialized, pairs of clusters are iteratively merged. In each iteration, the change to the global cost of every possible merge of two clusters $C_i$ and $C_j$ is considered, and the merge that results in the lowest global cost $E_{Global}$ is used. This proceeds to completion, when only a single cluster containing the shots remains, (or some other number, such as ten clusters, remains). In other words, the cluster cost/data term, which models the structure of visual data, may be obtained by computing the multiple minimum spanning trees, in which a model of a cluster is the total length of the $k^{th}$ minimum spanning tree (where k is proportional to the number of shots), after removing k−1 minimum spanning trees to compute the $k^{th}$ minimum spanning tree.

As a result, instead of a long thin cluster or a compact cluster which is rarely applicable to visual data, a model of intermediate clusters (like the intermediate cluster of FIG. 2) is used in the form of an energy function appropriate for intermediate clusters:

$$E_{Cluster} = \sum_i MST(C_i^k) \quad (2)$$

where MST refers to the minimum spanning tree, $k = \alpha(|C_i| - 1)$ is a fraction ($\alpha \in [0, 1]$) of the number of neighbors of any given node and where:

$$C_i^k = C_i^{k-1} - MST(C_i^{k-1}), \, C_i^1 = C_i \quad (3)$$

is a recursive definition by which $C_i^{k-1}$ may be computed by removing the edges in the MST from $C_i^{k-1}$; that is, $C_i^k$ is the graph obtained after removing k−1 MSTs in sequence from $C_i$. Note that to avoid the possibility of the graph becoming disconnected, instead of removing the edges, the edges may be replaced with the largest value of the shot match score. As described above, the pair-wise distance function $d(s_{t1}, s_{t2})$ between two shots is the matching cost between them in the cluster $C_i$, that is, the distance between the vector representations of two shots $s_{t1}$ and $s_{t2}$ at times t1 and t2.

The choice of a value for the parameter $\alpha$ gives control over how long and thin clusters may become, whereby for a suitable value of $\alpha$, the cluster cost in Equation (2) allows intermediate clusters but not long thin clusters. Clusters are expected to be relatively long because the appearance of different parts of a room can be quite different. At the same time, a continuum of possible camera viewpoints and multiple shots with similar (favored) viewpoints is expected, whereby the cluster is also expected to be quite dense. An intermediate value of $\alpha=0.3$ is used in one implementation.

With respect to the temporal prior term ($E_{Temporal}$, with $\lambda$ as a weighting factor), subsequent shots are more likely to show the same location. In general, the temporal prior term is based on the likelihood that two subsequent shots in a video are more likely to be captured in the same location than not. Thus, each pair of neighboring shots in the temporal sequence from the video are considered, with a penalty applied (e.g., by a temporal constancy mechanism 120 of FIG. 1) for each pair that is in different clusters, and not added otherwise.

Hard temporal segmentation was previously attempted to break a video into scenes captured in the same location, however the reduced temporal consistency in home video makes such a hard decision inappropriate; instead, a soft temporal prior is used to provide more temporal consistency in the results:

$$E_{Temporal} = \sum_t \delta(s_t, s_{t+1}) \quad (4)$$

where $\delta(s_t, s_{t+1})$ is an indicator function that determines if the shots $s_t$ and $s_{t+1}$ are in different clusters:

$$\delta(s_t, s_{t+1}) = \begin{cases} 1 & s_t \in C_i, s_{t+1} \in C_j, i \neq j \\ 0 & \text{otherwise.} \end{cases} \quad (5)$$

Equations (4) and (5) count the number of times those temporally neighboring shots belong to different clusters. In Markov Random Field terminology, these equations describe a Potts model where a penalty is added between neighboring frames if they occur in a different location.

Turning to another aspect, another difficulty for clustering by location is the presence of transient foreground objects, primarily people who sometimes appear in a location, and sometimes move about the location in the same shot. Further, the same people wearing the same clothing often appear in different locations, adding distractors to both the texton/(Latent Dirichlet Allocation) topic distances and the feature distances. Such events occur in both home videos and professionally edited content.

In one implementation, a Gaussian prior (difference of Gaussian detector) may be used to give extra weight to the parts of an image that are more likely to be background than foreground. In this manner, for example, the histograms may be weighted with the Gaussian spatial prior. In general, people are often centered in an image, and thus the center may be given less weight than other parts.

Figure 3:
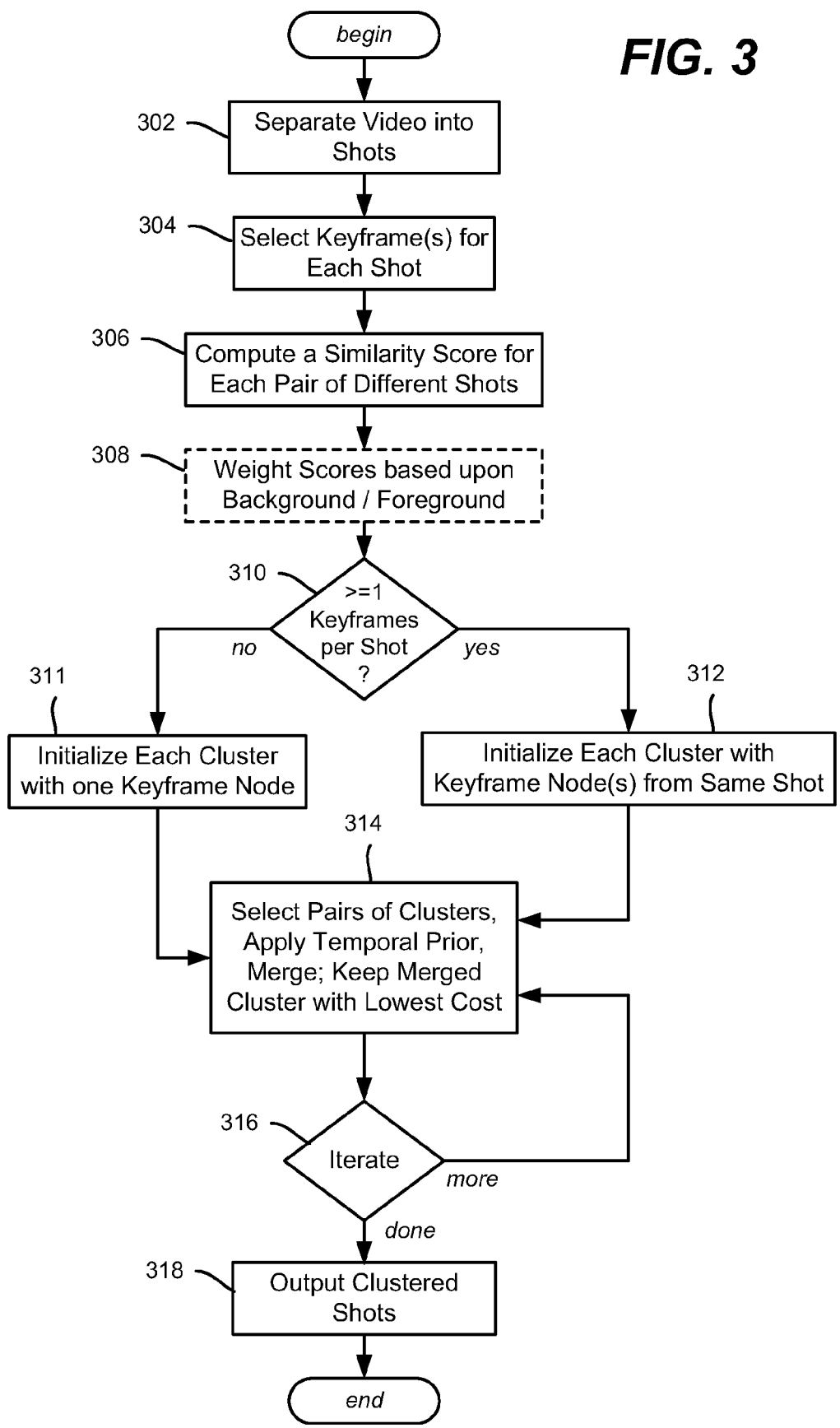
FIG. 3 is a flow diagram showing example steps for clustering videos based upon location.

By way of summary, FIG. 3 is a flow diagram showing example steps in processing video into location-based clusters. Step 302 represents separating video into the shots, with step 204 representing the selecting of one or more keyframes for each shot.

Step 306 represents computing the similarity scores for use in clustering similar shots together. Step 308 (shown as a dashed box as being optional), represents adjusting the weights to emphasize the background location and thereby account for foreground objects such as people in the shots.

Steps 310-312 are directed towards initializing the clusters. In general, there is initially one keyframe per cluster (step 311) if one frame of a set of frames is used, or one or more keyframes per cluster (step 312) such that the frames from the same shot are clustered together.

Step 314 represents the merging of clusters as described above. In general, given a set of clusters, each possible pair of clusters is merged as a merged candidate cluster, and a merging cost computed (which includes any temporal prior penalty) for each candidate. The merged candidate cluster with the lowest cost is kept.

Step 316 then iteratively loops back until some stopping criterion or criteria is met, thereby reducing the number of clusters. One example stopping criterion includes merging until some number of clusters remain (as few as one) so that a user can then browse each cluster to find a desired set of shots. For example, the user can quickly locate those videos that were taken in a particular room. The user may be able to vary this stopping number, e.g., to go back and increase or decrease the total number of clusters if the shots are not clustered as desired. Another example criterion may be based on a certain cost being achieved.

Step 318 outputs the clustered shots. Note that this may be a representative image or set of images for each cluster, or may be some or all of the video. Each keyframe may have an appropriate identifier or the like that allows an application to quickly locate the shots in the source video that correspond to the keyframes that are clustered together.

Exemplary Operating Environment

Figure 2:
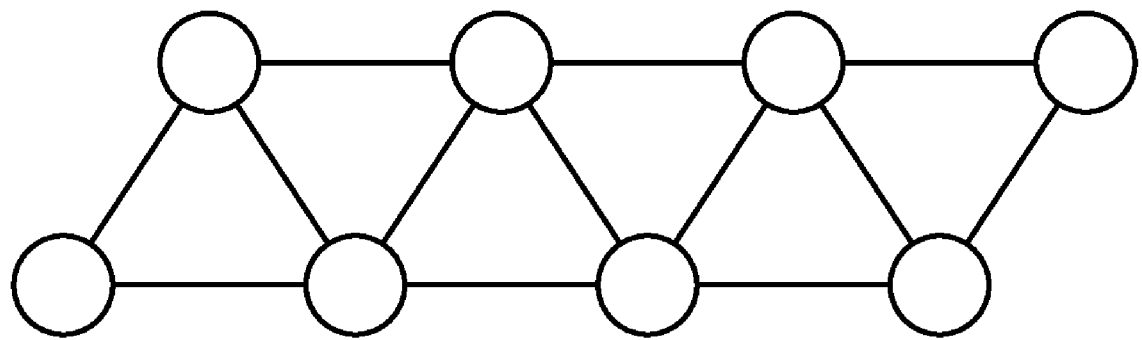
FIG. 2 is a representation of intermediate clusters modeled via an energy function.
Figure 4:
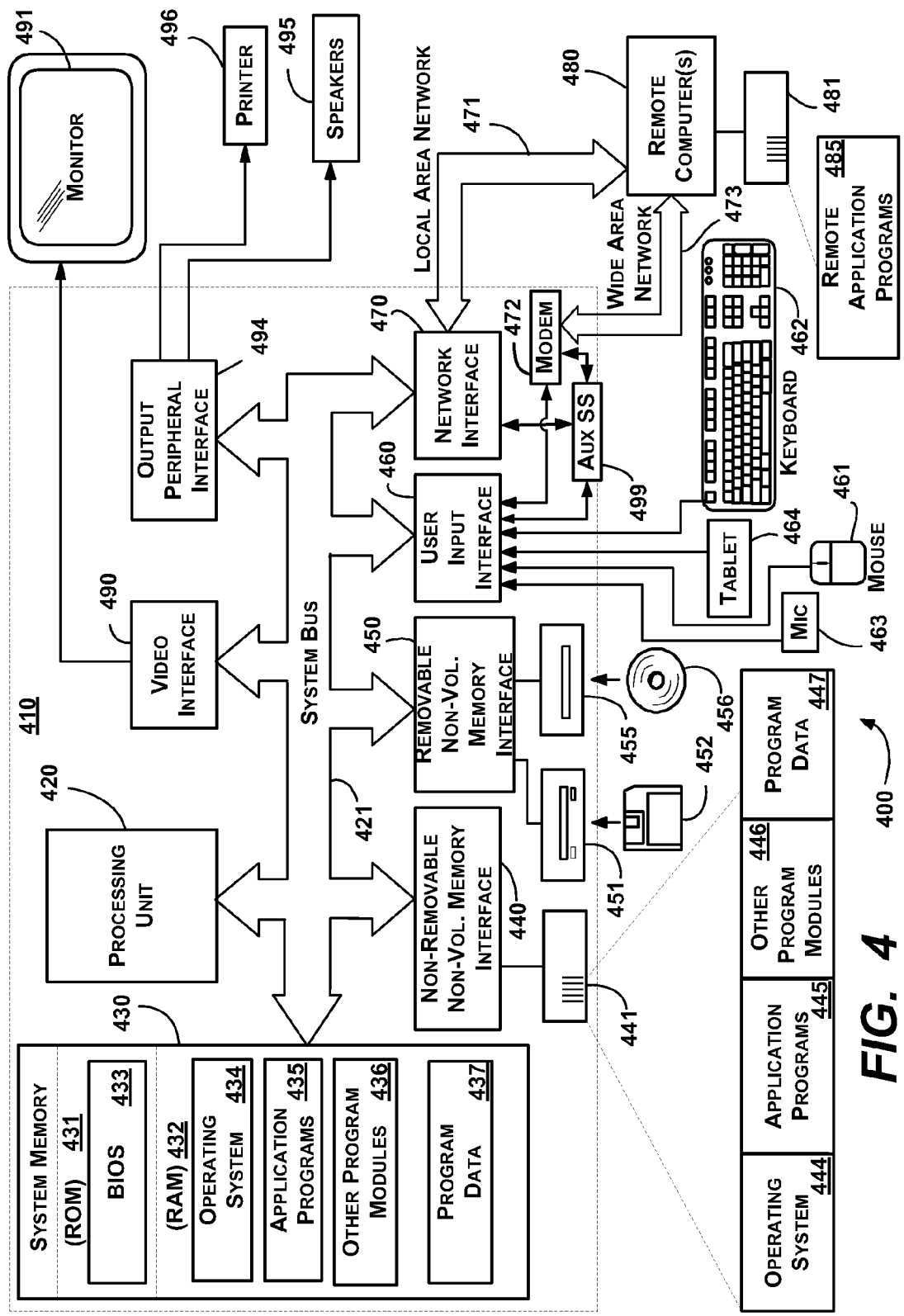
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, processing input video comprised of a plurality of shots, including determining (306) similarity between shots indicative of whether the shots were captured in a same location, and using (314) the similarity as part of a global energy function to cluster shots together by location.

2. The method of claim 1 wherein using the similarity as part of the global energy function comprises processing minimum spanning trees that represent the cost of clustering shots together.

3. The method of claim 1 wherein the global energy function comprises a temporal prior term, and further comprising, applying the temporal prior term to penalize neighboring shots in a temporal sequence that are in different clusters.

4. The method of claim 1 further comprising, separating the input video into a plurality of sets of frames, and selecting at least one keyframe from each set of frames as the shot or shots representative of that set.

5. The method of claim 4 wherein the keyframe of the set comprises a frame that is centered or substantially centered in time within that set of frames.

6. The method of claim 4 wherein selecting at least one keyframe comprises sampling a plurality of keyframes from the set of frames, and further comprising, initially clustering together the plurality of keyframes sampled from the set.

7. The method of claim 1 wherein determining the similarity between the shots comprises determining a texton histogram for each of the shots.

8. The method of claim 1 wherein determining the similarity between the shots comprises computing a vector representative of each of the shot, in which the vector emphasizes background information in the shot over foreground information in the shot.

9. The method of claim 1 wherein using the similarity comprises selecting pairs of clusters, merging each pair into a merged candidate cluster, keeping the merged candidate cluster with a lowest cost, and iterating to further merge clusters until a stopping criterion or criteria is met.

10. In a computing environment, a system comprising, a clustering mechanism (104) that clusters shots representative of video frames into clusters of shots (106) having similar locations, including by optimizing a global energy function (118) using agglomerative clustering based upon similarity scores (114) between pairs of shots.

11. The system of claim 10 wherein the clustering mechanism further optimizes the global energy function based upon temporal consistency between shots.

12. The system of claim 11 wherein the global energy function is based upon a sum of similarity score data and temporal consistency data, in which a weighting factor is used to control how much the similarity score data and temporal consistency data contribute to the sum relative to one another.

13. The system of claim 10 wherein the clustering mechanism arranges the shots as nodes of a minimum spanning tree having edges with weights that are based at least in part on the similarity score between the shots represented by their respective nodes.

14. One or more hardware computer storage device having computer executable instructions, which when executed performs steps, comprising:
- separating (302) video into sets of frames based upon shot boundary detection;
- selecting (304) at least one keyframe from each set of frames;
- computing (306) a similarity score based on similarity between the keyframe or keyframes of each set;
- computing (314) temporal data based upon whether a keyframe is temporally consistent with another keyframe; and
- using (314) the similarity score and the temporal data to cluster shots, as represented by their keyframes, together.

15. The one or more computer-readable media of claim 14 wherein the similarity score and the temporal data for a pair of keyframes correspond to a cost, and wherein using the similarity score and the temporal data to cluster shots comprises, selecting pairs of clusters, merging each pair into a merged candidate cluster, keeping the merged candidate cluster with a lowest cost, and iterating to further merge clusters until a stopping criterion or criteria is met.

* * * * *